May 18, 1926.
A. T. GREEN
1,585,026
REBORING APPLIANCE FOR ENGINE BEARINGS
Filed Feb. 6, 1925
2 Sheets-Sheet 2
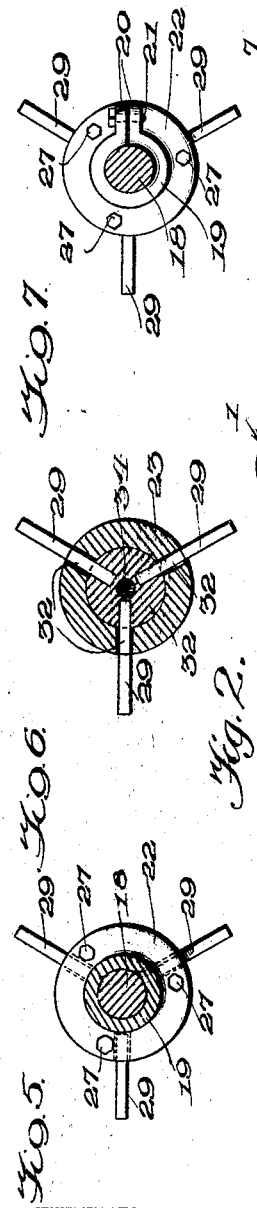
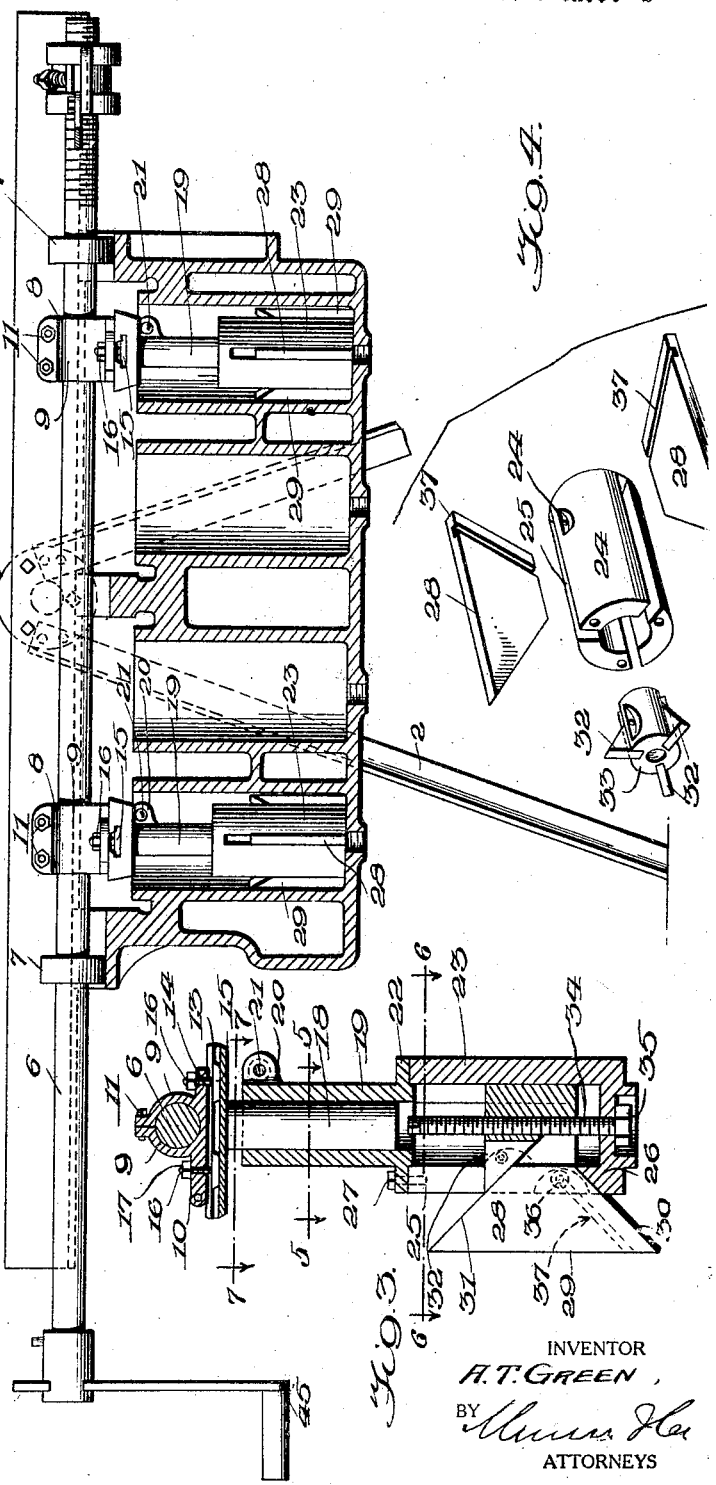
INVENTOR
A. T. GREEN Patented May 18, 1926.

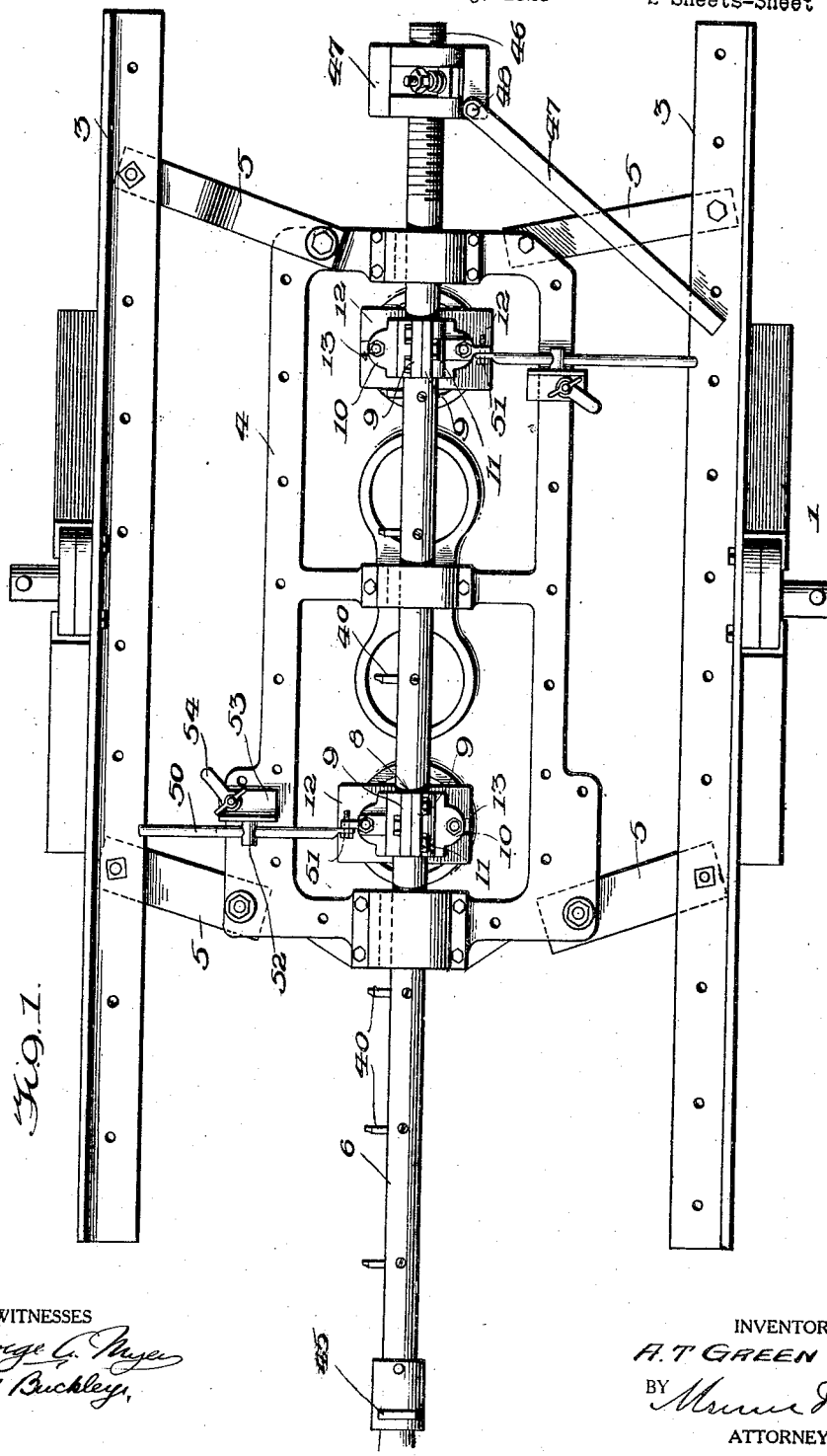

1,585,026

UNITED STATES PATENT OFFICE.

ANSEL T. GREEN, OF ABERDEEN, SOUTH DAKOTA, ASSIGNOR TO HUB CITY IRON WORKS, OF ABERDEEN, SOUTH DAKOTA, A CORPORATION OF SOUTH DAKOTA.

REBORING APPLIANCE FOR ENGINE BEARINGS.

Application filed February 6, 1925. Serial No. 7,369.

The present invention aims to provide a reboring appliance for engine bearings which is especially adapted for use in reboring the main bearings of internal combustion engines of the type used on automobiles, trucks, and tractors.

One of the principal objects of the invention is to provide an appliance of this character which is entirely universal in that it may be used with equal advantage on almost any four, six or eight cylinder motor and which rebores the engine bearings with precision assuring alignment and producing a better bearing surface than is possible with hand-fitting methods. The appliance assures perfect alignment, not only between the main bearings themselves, but also between the crank shaft and the cylinders which feature has among others, the important advantage of causing the timing gears to mesh at the proper depth.

A further object resides in the provision of an appliance having the advantages and capacities mentioned and which is of simple and durable construction and entirely practical, which may be readly set up, operated and controlled, which is adjustable for use in various types of engines and which is comparatively inexpensive to manufacture and operate.

Other objects and advantages reside in certain novel features of the construction, arrangement and combination of ports which will be hereinafter more fully described and particularly pointed out in the appended claims, reference being had to the accompanying drawings forming a part of this specification, and in which:

Figure 1 is a plan view of the boring appliance constituting the present invention in use;

Figure 2 is a view thereof in central longitudinal vertical section, parts being shown in elevation for the sake of illustration;

Figure 3 is a detail view in vertical section of one of the bearings and mountings for the boring bar;

Figure 4 is a group view in perspective of one of the heads of the mountings showing the parts associated with the head prior to assembly;

Figure 5 is a detail view in horizontal section on line 5—5 of Figure 3;

Figure 6 is a similar view on line 6—6 of Figure 3; and

Figure 7 is a view similar to Figures 5 and 6 on line 7—7 of Figure 3.

Referring to the drawings the numeral 1 designates generaly a frame which includes legs 2 supporting side bars 3 on which the engine block 4 is supported by straps 5 or other suitable means. The engine block is supported at an inverted position with the oil pan removed and at the start of the operation the bearings are also removed.

A boring bar designated generally at 6 is provided and is located and properly positioned by means of centering bushings 7 having outside diameters adapted to fit the bores of the bearing when the bearing shells are out and having such inside diameters as to receive the boring bar. These bushings locate the boring bar centrally of the bearings so that when the bearings have been rebored the crank shaft will be exactly in the center of the bores of the crank case making the timing gears meshed together properly and placing the crank shaft in perfect alignment with the cylinders. The centering bushings are provided in sets, one set being adapted for each motor or type of motor. Of course it is necessary to provide different sizes of centering bushings for the different sizes and types of motors as these bushings must fit exactly the crank case bearing bores on the outside and the boring bar on the inside.

Bearings 8 are provided and each bearing 8 includes bearing members 9 mounted on a base 10 and held together by fastening devices 11. The bearings 8 are mounted for transverse adjustment on bearing brackets 12, the brackets 12 having inverted T-shaped slots 13. Bolts 14 are provided and have heads 15 slidably fitted in the slots 13 and have their shanks 16 extending through bolt holes provided therefor in the bases 10 of the brackets 8. Nuts 17 are threadedly engaged with the shanks 16 of the bolts 14 and are adapted to clamp the bases 10 of the brackets 8 to hold the bearings 8 in transverse adjustment.

The brackets 12 are carried at the upper ends of posts 18 which are fitted in split clamping sleeves 19 having clamping ears 20 with which a bolt and nut 21 is cooperable to firmly clamp the sleeves 19 to the posts 18. Each sleeve 19 has an annular flange 22 adjacent its lower end and this flange is engageable with the upper end of a slotted head 23 associated with each bracket 12.

Each slotted head 23 consists of a cylindrical body 24 having a plurality of lengthwise slots 25 which extend from one end to but not through the other end of the body and the slots 25 have inclined end walls 26 at the closed end of the body of the head as shown to advantage in Figure 3. The upper end of the body through which the slots extend is prevented from spreading by the flange 22 which is fastened to the upper end of the body by bolts 27 and this arrangement also serves to connect the head with the sleeve 19. In each slot 25 a gripper 28 is fitted. Each gripper 28 has its outer edge 29 adapted to engage and grip the wall of a cylinder of an engine. The grippers 28 also have inclined edges 30 and 31, the inclined edges 30 being cooperable with the inclined end walls 26 of the slots 25 and the inclined edges 31 being engaged by triangular expanding members 32 carried on an expanding nut 33 slidably fitted within the hollow cylindrical body 23 and operated from a screw 34 having a squared head 35 exteriorly of the body whereby the screw may be operated with facility. The expanding members 32 also operate in the slots 25 and as the expanding nut 33 is drawn down through the body the expanding members force the grippers 28 outwardly due to the coaction of the inclined edges of the expanding members with the inclined edges 31 of the grippers and to the coaction of the inclined edges 30 of the grippers with the inclined end walls 26 of the slots 25. Displacement of the grippers 28 from the slots 25 beyond the limits of the adjustment of the grippers is prevented by the action of pins 36 carried by the body 24 and operating in slots 37 provided on the grippers.

The heads 23 with the grippers 28 and the brackets 12 provide a mounting for the bearings 8 which are designed to provide a permanent support for the boring bar 6 during the reboring operation. The boring bar is first centered and positioned by the bushings 7 after having been placed in the bearings 8. The bearings 8 are adjustable on the brackets 12 to accommodate themselves to the properly centered boring bar and after they have been properly positioned they are fastened and secured and the bushings 7 are removed. The main bearings of the engine are then placed in position.

Cutters or boring tools 40 are mounted on the boring bar and are set by a micrometer so that they will bore the bearings precisely as desired.

Means is provided for turning the boring bar 6 and preferably comprises a hand crank 45 fixed to one end of the boring bar.

The end of the boring bar opposite the hand crank is provided with a screw 46 with which a feed nut 47 co-operates so that the boring bar is advanced as the same is rotated. A holding bar 47 is connected with the feed nut as at 48 and is engageable with the side bars 3 of the frame to hold the feed nut against turning.

The main mounting of the bearings 6 is in the cylinders of the block by means of the heads 23 and grippers 28 and these bearings are preferably braced from the opposite sides of the crank case by means of brace bars 50 pivotally connected, as at 51, to the bearings 8 and slidably fitted through studs 52 carried by angular attaching plates 53 which are secured to the crank case by clamps 54.

The bearings 8 may be adjusted to properly fit the boring bar by means of three small screws, two of which may be used to draw the bearing together and the other screw located between the first two may be used to push the bearing open, said bearings being split open across the top to permit of such slight adjustment in order that they may closely fit the boring bar when the appliance is in operation.

I claim:

1. In a reboring appliance for engine bearings, a rotatable boring bar, bearings for said bar, and mountings for said bearings including expansible means having unyielding grippers engageable with the cylinders of the engine and positively operable and unyielding means for expanding the grippers into binding engagement with the walls of the cylinders to rigidly and securely connect the mountings to the cylinders.

2. In a reboring appliance for engine bearings, a rotatable boring bar, bearings for said bar, and mountings for said bearings including heads adapted to be fitted in the cylinders of the engine, said heads having grippers designed to engage the walls of the cylinders of the engine, and positively operable means for expanding said grippers.

3. In a reboring appliance for engine bearings, a rotatable boring bar, bearings for said bar, and mountings for said bearings included slotted heads adapted to be fitted in the cylinders, grippers fitted in said slots and designed to engage the walls of the cylinders of the engine, and expanding means for the grippers comprising expanding members cooperable with the grippers a nut carrying the expanding members, a screw for operating the nut, and pins carried by the head, said grippers having slots receiving the pins.

4. In a reboring appliance for engine bearings, a rotatable boring bar, bearings for said bar, and mountings for said bearings including slotted heads adapted to be fitted in the cylinders, grippers fitted in the slots and adapted to engage the cylinders and expanding means for the grippers comprising expanding members operating in the slots and engaging the grippers, and means for operating said expanding members.

5. In a reboring appliance for engine bearings, a rotatable boring bar, bearings for said boring bar, mounting for said bearings including heads designed to be fitted in the cylinders of the engine, grippers carried by the heads and engageable with the cylinders, brackets carried by the heads, and means for adjustably connecting the bearings to the brackets and holding same in adjusted position.

6. In a reboring appliance, for engine bearings of the character described and in accordance with claim 5 and wherein said means includes bolts connected with the bearings and having heads, the brackets having inverted T-shaped slots accommodating the heads of the bolts and fastening means engaged with the bolts and with the bearings.

ANSEL T. GREEN.